Oct. 16, 1934.  W. C. HEDGCOCK  1,977,585
TRUCK
Filed Dec. 11, 1931     2 Sheets-Sheet 1
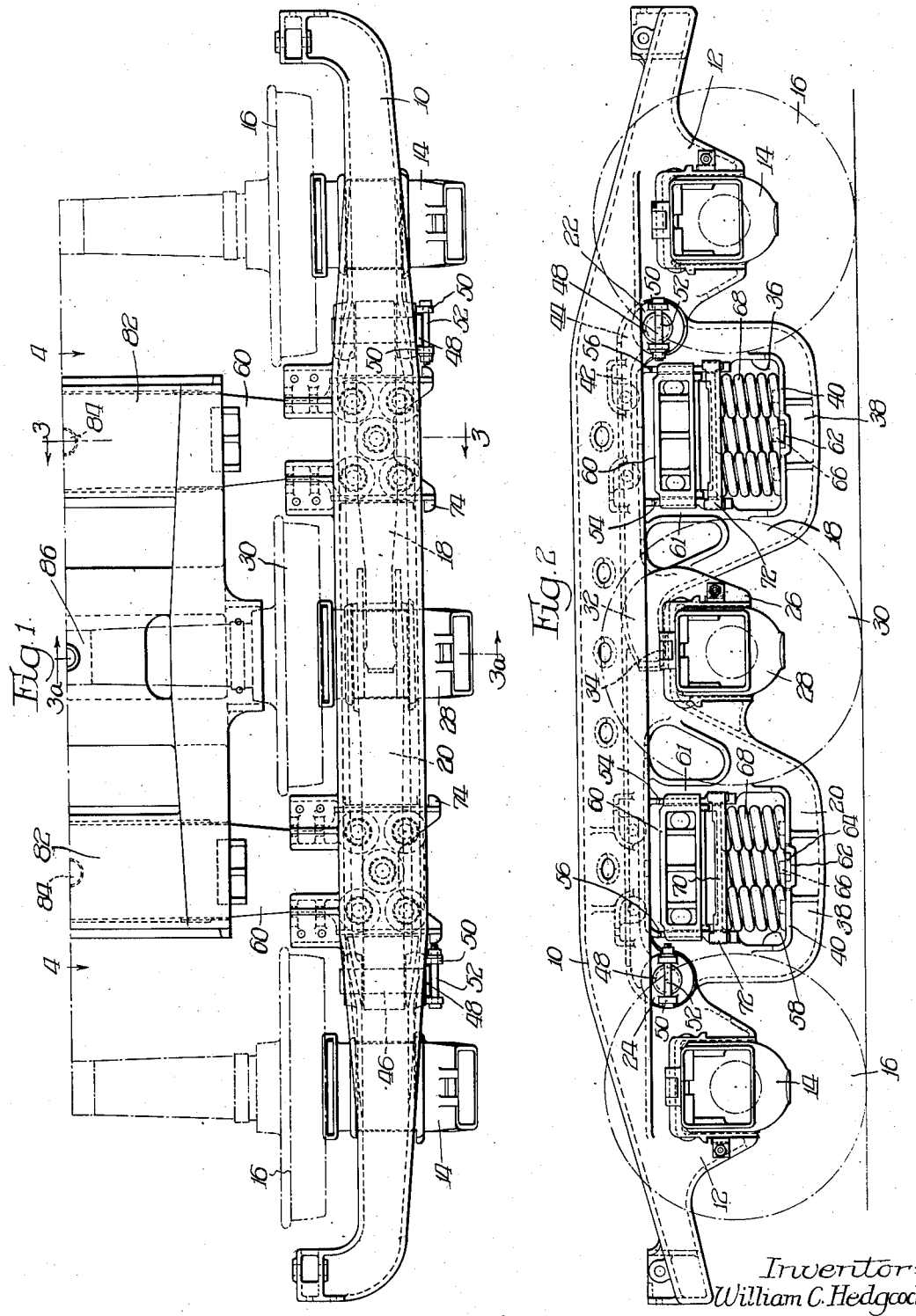
Inventor:
William C. Hedgcock
By Wilkinson, Huxley, Byron & Knight Attys Oct. 16, 1934. W. C. HEDGCOCK 1,977,585
TRUCK
Filed Dec. 11, 1931 2 Sheets-Sheet 2
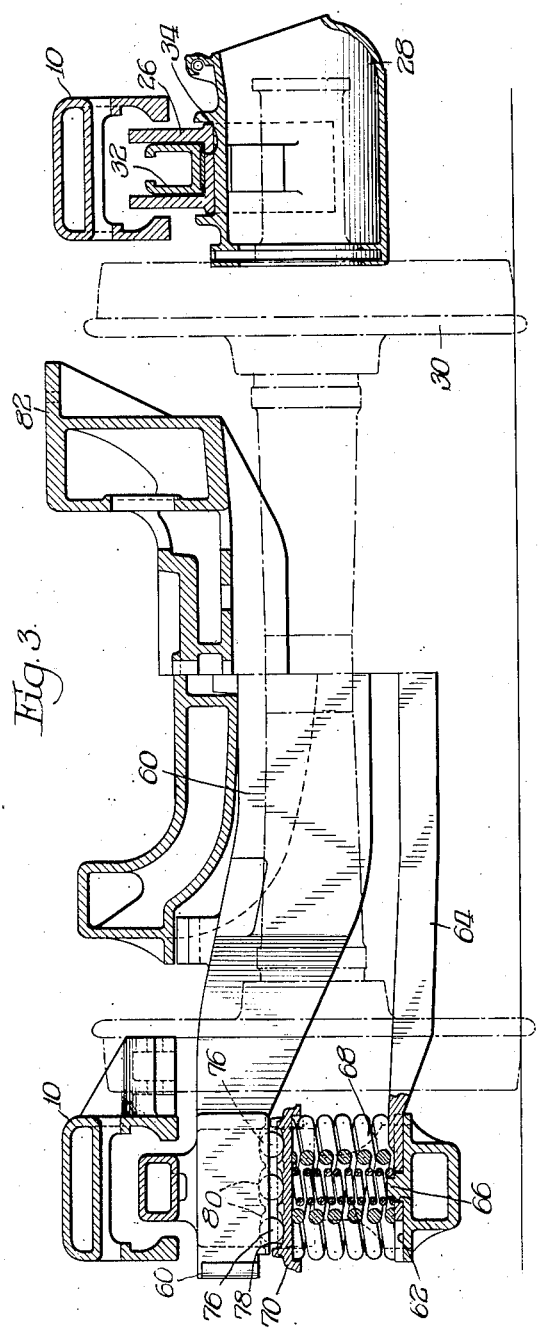
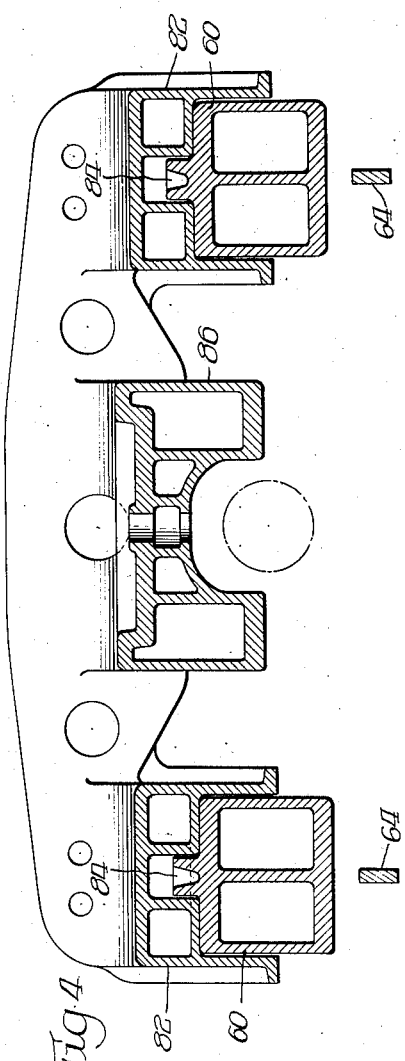
Inventor
William C. Hedgcock
By Wilkinson, Huxley, Byron + Knight
Attys Patented Oct. 16, 1934

1,977,585

UNITED STATES PATENT OFFICE 1,977,585

TRUCK

William C. Hedgcock, Wilmette, Ill., assignor to American Steel Foundries, Chicago, Ill., a corporation of New Jersey Application December 11, 1931, Serial No. 580,307

17 Claims. (Cl. 105—195)

This invention pertains to truck construction, and more particularly to six-wheel railway car trucks.

It is an object of this invention to provide a simple and efficient six-wheel railway car truck which is flexible in operation and in which the loads are equalized in a simple and efficient manner.

Another object of the invention is to provide a truck construction wherein improved equalizing levers are incorporated by means of which the wheel base of a railway car truck may be reduced to a minimum.

A further object of the invention is to provide a six-wheel car truck wherein equalizing means are provided between the axles for supporting the bolsters and permitting lateral movement thereof.

A still further object of the invention is to provide a six-wheel construction wherein the bolster is supported for lateral movements with respect to the other truck members and to permit free equalization of loading between the wheels of each side of the truck.

A yet further object is to provide a six-wheel truck construction wherein the side frames are substantially connected and wherein the bolsters are mounted for lateral movements for reducing impact or thrust from the car body to the side frames, journals, and wheel and axle assemblies.

Another object is to provide an improved connection between equalizer members and other portions of a truck structure.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a fragmentary top plan view of a truck construction embodying the invention;

Figure 2 is a side elevation of the truck construction shown in Figure 1;

Figure 3 is a transverse sectional elevation of a truck construction embodying the invention wherein the left half of the figure is taken substantially in the plane as indicated by the line 3—3 of Figure 1, and wherein the right half is taken substantially in the plane as indicated by the line 3a—3a of Figure 1;

Figure 4 is a longitudinal sectional elevation taken substantially in the plane as indicated by the line 4—4 of Figure 1.

In the truck construction illustrated, the side frame 10 is provided with depending end jaws 12 adapted to receive and rest upon the end journal boxes 14 which have cooperative relation with the journal ends of the wheel and axle assemblies 16. It will of course be understood that the journal boxes may be integrally formed and of any preferred character. The side frame 10 is substantially of inverted U-shape intermediate the ends thereof, as shown in Figure 3, for receiving the upper portions of the equalizing members 18 and 20, said equalizing members being pivotally connected as at 22 and 24 to the side frame 10. The equalizing member 20 is provided with the depending jaws 26 fitted to receive and rest upon the central journal box 28, said journal box having cooperative relation with the journal ends of the central wheel and axle assembly 30.

The equalizing member 18 interengages as at 32 with the equalizing member 20 above the middle journal box 28 and rests upon the seat 34. The equalizing members 18 and 20 are provided with bolster openings 36 and include the lower tension member 38, provided with the spring seat portion 40, and the upper compression member 42. The tension and compression members merge adjacent one end 44, and are apertured for the reception of the shank of the headed pin 46. The head 48 of the pin is disposed outwardly of the side frame, and the side frame is provided with spaced lugs 50 adapted to receive the securing bolt 52 for locking the pin in position, thus providing a safe and secure method of retaining the pin, and at the same time providing this retaining feature on the outer face of the truck where it is readily accessible for inspection. The opposite ends of the tension and compression members merge for the provision of the journal box receiving portion 26 and the seat portion 34. The equalizing members are provided with the bolster guide faces 54 and 56 which serve to space and guide the motion of the bolster members 60. The face 54 is preferably provided on the integral member 61 forming a portion of the bolster opening, and said opening is provided with a relatively enlarged lower portion 58 for clearance for insertion of the bolster before the springs are mounted.

The spring seats 40 are recessed at 62 for the reception of the ends of the tie member 64 adapted to embrace the dowel 66 provided on the spring seat whereby the tie member serves to connect two equalizing members on opposite sides of the truck. The equalizing members in turn tie the side frames together by virtue of the connection between the equalizing members and the side frames. With the use of the tie bar construction, a truck is provided which permits of the application of a lateral motion device, and eliminates the use of a spring plank construction, yet at the same time maintains the opposite equalizers in squared relation. Thus the entire squaring action is not effected by the pivotal connections 48 and danger of binding between the equalizers and side frame adjacent the top of said equalizers is prevented so that the equalizers are always maintained in operative relation to the truck. The nests of springs 68 are provided on the spring seat, and the weight of certain of the spring groups is carried upon the end of the tie member 64, thereby holding the tie member down tightly against vibration and wear. The recess 62 is preferably of such depth that the top surface of the end of the tie member is flush with the top surface of the remainder of the spring seat, thus providing a level surface for the entire spring group. The dowel 66 on the spring seat is extended sufficiently above the depth of the recess to provide a centering dowel for the center coil spring of the spring group.

The spring group supports roller seats 70 provided with guides 72 having engagement with the bolster guide surfaces 54 and 56 for permitting vertical movement thereof. The bolster members 60 extend into the bolster opening and have bolster guide cooperating surfaces and have lugs 74 for limiting lateral motion of the bolsters. Lateral motion of the bolsters is permitted by means of the rollers 76 disposed between the roller seat 72 and the bolsters 60 and retained within suitable seats 78 and 80 provided in said roller seat and bolster. The bolsters are thereby permitted a certain amount of lateral motion by the action of the rollers, the extent of the lateral motion being controlled within a desired range by means of the stops or lugs 74 which abut against the edges of the bolster guides 54 and 56 when the desired limit of lateral motion is reached. This provision for lateral motion of the bolsters has the advantage of reducing the impact or thrust imparted to the side frames, journals and wheels by the lateral motion of the car body. The bolster members 60, which may be termed equalizing bolsters, are provided with the cross bolster 82 positioned on the equalizing bolsters by means of the dowels 84 and being provided with the center bearing 86. This bolster construction is substantially that illustrated in Patent No. 1,377,706.

With the construction illustrated, it will be seen that there is provided a six-wheel truck construction wherein lateral motion is provided between the bolster and the side frame. Equalizing members are disposed to equalize the loads transmitted from the car body to the wheel and axle assemblies, thus providing a truck of improved riding qualities, as well as one which fulfills all requirements of manufacture and service.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

What is claimed is:

1. In a six-wheel car truck, the combination of spaced side frames having end journal boxes, equalizing levers operatively connected to said side frames, a tie member connecting opposite equalizing levers, one of said equalizing levers on each side of said truck having an intermediate journal box, and a flexible bolster having separate transverse members which are associated for lateral movements with said equalizing levers for transmitting loads through said equalizing levers to all of said journal boxes.

2. In a six-wheel car truck, the combination of spaced side frames having end journal boxes, equalizing levers pivotally connected to said side frames, a tie member connecting opposite equalizing levers, one of said equalizing levers on each side of said truck having an intermediate journal box, springs carried by said equalizing levers, and a flexible bolster having separate transverse members which are mounted for lateral movements upon said springs and transmit loads through said springs and equalizing levers to all of said journal boxes.

3. In a six-wheel car truck, the combination of spaced frames having end journal boxes, equalizing levers pivotally connected at their outer ends to said side frames and being telescopically arranged at their inner ends, a tie member connecting opposite equalizing levers, one of said equalizing levers on each side of said truck having an intermediate journal box, and a bolster having transverse members mounted for lateral movements and through which loads may be transmitted to said equalizing levers and then to all of said journal boxes for equally distributing the load therebetween.

4. In a six-wheel car truck, the combination of spaced side frames having end journal boxes, equalizing levers the outer ends of which are pivotally connected to said side frames and the inner ends of which are telescopically arranged, a tie member connecting opposite equalizing levers, one of said equalizing levers on each side of said truck having an intermediate journal box, said equalizing levers having tension and compression members spaced apart, springs mounted on said tension members, and a bolster having separate cross bolster members mounted on lateral motion means resting on said springs intermediate the tension and compression members for transmitting loads through said springs and equalizing levers to all of said journal boxes.

5. In a six-wheel car truck, the combination of spaced side frames having end journal boxes, equalizing levers the outer ends of which are pivotally connected to said side frames and the inner ends of which are telescopically arranged, a tie member connecting opposite equalizing levers, one of said equalizing levers on each side of said truck having an intermediate journal box, said equalizing levers having tension and compression members spaced apart, springs mounted on said tension members, a bolster having separate cross bolster members mounted on lateral motion means resting on said springs intermediate the tension and compression members for transmitting loads through said springs and equalizing levers to all of said journal boxes, and stop members on said bolster members for limiting relative lateral movement of said bolster members and side frames.

6. In a six-wheel car truck, the combination of spaced side frames having end journal boxes, equalizing levers operatively connected to each of said side frames, a tie member connecting opposite equalizing levers, one of each of said equalizing levers having an intermediate journal box, and bolster members mounted for lateral movements with said equalizing levers for transmitting loads through said equalizing levers to all of said journal boxes.

7. In a six-wheel car truck, the combination of spaced side frames having end journal boxes, equalizing levers operatively connected to each of said side frames, a tie member connecting opposite equalizing levers, one of each of said equalizing levers having an intermediate journal box, and bolster members mounted on said equalizing levers for transmitting loads through said equalizing levers to all of said journal boxes.

8. In a six-wheel car truck, the combination of spaced side frames having end journal boxes, equalizing levers pivotally connected to each of said side frames, a tie member connecting opposite equalizing levers, one of each of said equalizing levers having an intermediate journal box, springs carried by said equalizing levers, lateral motion means carried by said springs, and bolster members mounted on said lateral motion means.

9. In a six-wheel car truck, the combination of spaced side frames having end journal boxes, equalizing levers pivotally connected to each of said side frames, a tie member connecting opposite equalizing levers, one of each of said equalizing levers having an intermediate journal box, springs carried by said equalizing levers, lateral motion means carried by said springs and guided by said equalizing levers, and bolster members mounted on said lateral motion means.

10. In a six-wheel car truck, the combination of spaced side frames having end journal boxes, equalizing levers pivotally connected to each of said side frames, said levers including tension and compression members spaced apart and integral connecting columns, a tie member secured to the tension members of opposite equalizing levers between said columns, one of each of said equalizing levers having an intermediate journal box, springs carried by the tension members of said equalizing levers, lateral motion means carried by said tension members and guided by said columns, and bolster members mounted on said lateral motion means between said columns.

11. In a six-wheel truck, the combination of spaced side frames, an intermediate journal box, an equalizing lever in the form of a truss operatively connected to each of said side frames and journal box whereby the wheel base is reduced to a minimum, a tie member connecting opposite equalizing levers, and a bolster resiliently supported on said lever for lateral movements relative to said side frame.

12. In a six-wheel truck, the combination of spaced supports, a journal box, an equalizing lever in the form of a truss operatively connected to each of said supports and journal box whereby the wheel base is reduced to a minimum, a tie member connecting opposite equalizing levers, and a member resiliently supported on said levers for lateral and vertical movements relative to said supports, said member being disposed above said tie members.

13. In a railway car truck, the combination of spaced side frames and an equalizing lever in the form of a truss operatively connected to each of said supports, a tie member connecting opposite equalizing levers, and a bolster resiliently supported on said levers for lateral movements relative to said side frames.

14. In a railway car truck, the combination of spaced side frames, an equalizing lever having tension and compression members spaced intermediate their ends to form a bolster opening and associated with each of said side frames, a tie member connecting opposite equalizing levers, and a bolster mounted for lateral movements in said opening.

15. In a railway car truck, the combination of spaced side frames and an equalizing lever associated therewith in the form of a truss including tension and compression members joined at their ends and spaced intermediate their ends, a tie member connecting opposite equalizing levers, a connecting member together with a portion of the tension member forming the side walls of a bolster opening, and a bolster mounted for lateral movements in said opening.

16. In a six-wheel truck, the combination of spaced side frames having journal box openings, journal boxes mounted in said openings, equalizing levers having their outer ends fulcrumed on said side frames and their inner ends supported upon an intermediate journal box, a tie member connecting opposite equalizing levers, said equalizing levers each having tension and compression members spaced intermediate their ends to form a bolster opening, and bolster members received in said bolster openings for transmitting a load to said journal boxes through said equalizing levers and side frame, said bolster members being mounted for lateral movements in said openings.

17. In a six-wheel truck, the combination of spaced side frames having end journal boxes, equalizer members pivoted to said side frames and having interengaging portions, one of said equalizer members having a central journal box, a tie member connecting opposite equalizing levers, said equalizer members having bolster openings, a bolster disposed in each of said openings and resiliently supported on said equalizer members, and lateral motion means interposed between said bolsters and the resilient supports therefor to permit lateral movements of said bolsters.

WILLIAM C. HEDGCOCK.